J. H. ANDERSON.
HAY STACKER.
APPLICATION FILED FEB. 12, 1910.
1,003,390.
Patented Sept. 12, 1911.
2 SHEETS—SHEET 1.
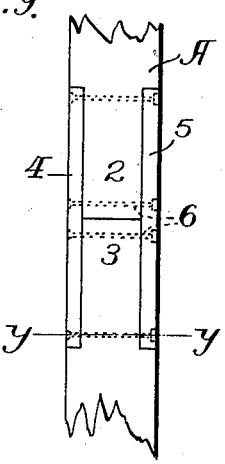
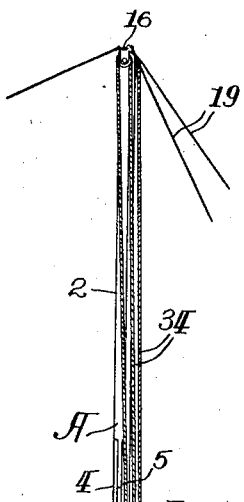
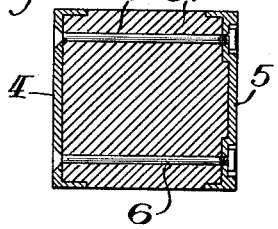
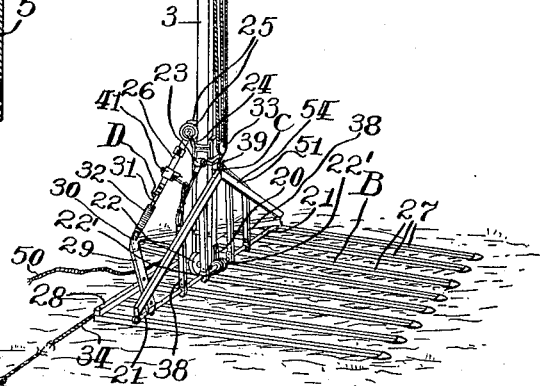
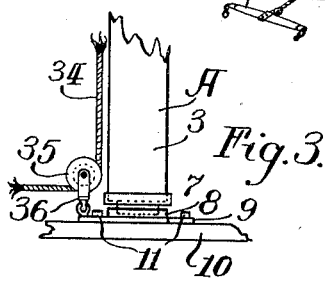
Witnesses:
Inventor:
John H. Anderson,
by Attorney.

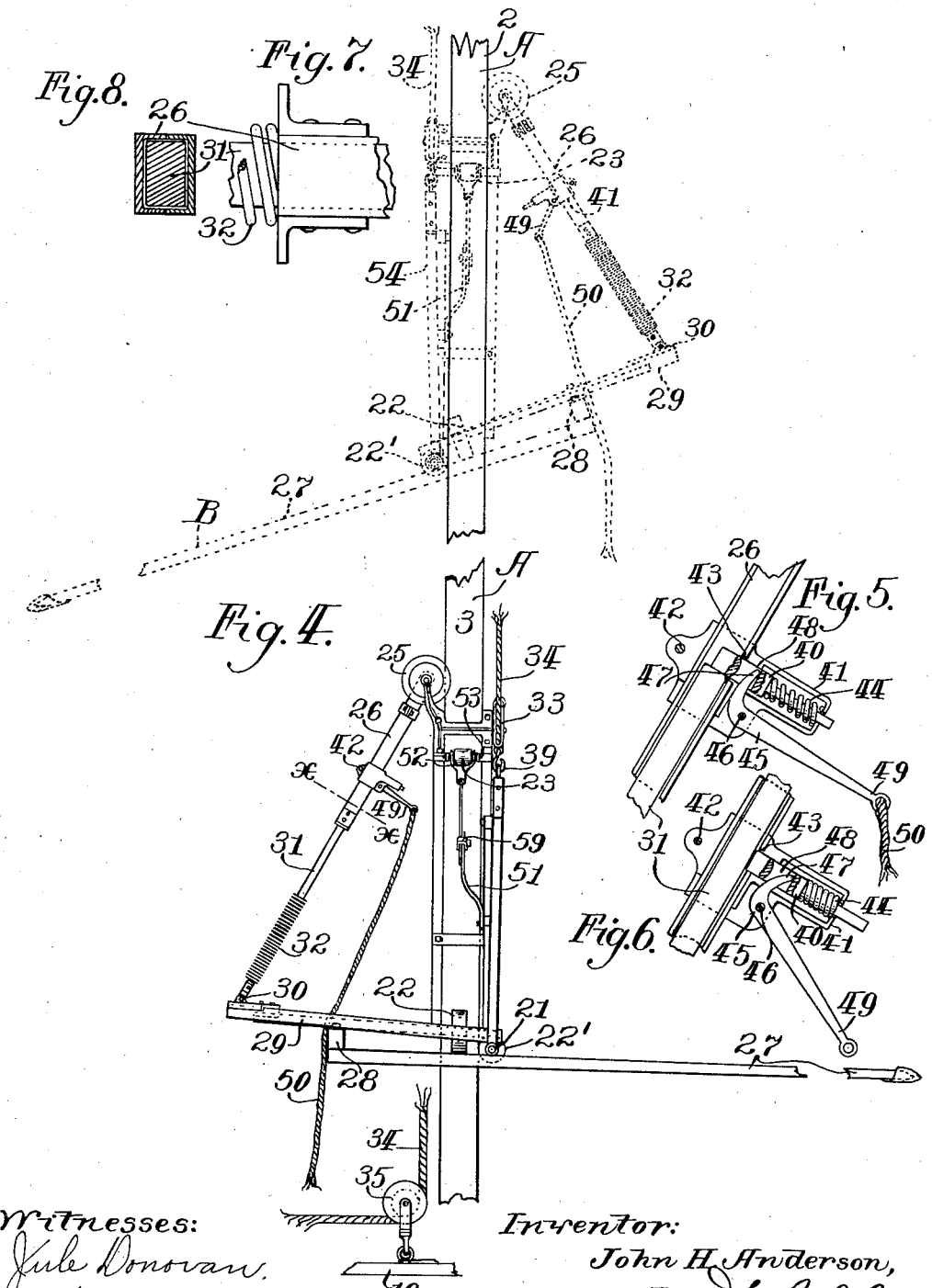

UNITED STATES PATENT OFFICE.

JOHN H. ANDERSON, OF ST. PAUL, MINNESOTA.

HAY-STACKER.

1,003,390.  Specification of Letters Patent.  Patented Sept. 12, 1911.

Application filed February 12, 1910. Serial No. 543,483.

*To all whom it may concern:*

Be it known that I, JOHN H. ANDERSON, a citizen of the United States, residing at St. Paul, in the county of Ramsey and State of Minnesota, have invented a new and useful Improvement in Hay-Stackers, of which the following is a specification.

My invention relates to an improved hay stacker, the primary object of which is to provide improved mechanism by which hay, straw, manure and the like may be conveniently and compactly stacked by a minimum expenditure of time and labor.

By the use of my improved apparatus hay can be dumped at any elevation, the stacker can be swung around either way, hay can be dropped anywhere on the stack, and the stacker can be operated in windy weather and with less help than heretofore.

By the use of my improved stacker, hay can be loaded on wagons and the stacker can be taken apart for convenience in transporting it and easily and quickly erected.

Further the stacker is simple, strong and durable.

In the accompanying drawings forming part of this specification Figure 1 is a perspective view of my improved hay stacker; Fig. 2 is an elevation of a detail showing the upper end of the standard; Fig. 3 is a detail showing the lower end of the standard; Fig. 4 is an enlarged detail showing a side elevation of the stacker, the full lines indicating the platform in lower position and the broken lines the platform when in raised position; Fig. 5 is a detail of the ratchet mechanism the parts being shown partly in section and illustrated when the platform is in lower position; Fig. 6 is another detail of the construction illustrated in Fig. 5 showing the parts in position when the platform is raised; Fig. 7 is a detail of the ratchet mechanism illustrating the stop and cushion for limiting and cushioning the movement of the platform when released into declining position; Fig. 8 is a section of Fig. 7 taken upon the line X—X; Fig. 9 is a side view of a detail showing the splice between sections of the standard and Fig. 10 is a section of Fig. 9 taken upon the line Y—Y.

My invention has in combination the following principal elements; a standard A which is of convenient construction so that it can be easily transported and erected to swivel, a platform B which rests normally upon the ground in substantially horizontal position, a carriage C upon which the platform is journaled so that it can tilt with its forward end into declining position to discharge the load of hay therefrom, ratchet mechanism D mounted upon the rear end of said platform and adapted to engage with said carriage to support the latter in horizontal position and when disengaged therefrom to permit the platform to decline, and hoisting apparatus E by which the carriage with its platform is elevated on said standard.

The standard A is in the form of a square post although it can be constructed out of metal and made tubular when desired. This post for convenience in transporting the apparatus is made in two longitudinal sections 2 and 3 the abutting ends of which are spliced together by a pair of oppositely disposed channel plates 4 and 5 overlapping the ends of the sections and secured in place by bolts 6 passing through the channel plates and sections for holding the parts rigidly and separably together. The channel plates are recessed into said sections flush with the surface of the post and said bolts are recessed into the channel plates as illustrated in Figs. 9 and 10 for the purpose of producing a smooth and even surface on the standard so that the carriage will run smoothly thereon. The lower end of the standard is stepped in a journal bearing 7, the journal cup member 8 of which has a flange 9 secured to a mounting support 10 (a portion of which is illustrated in the drawings) by lag bolts 11. The upper end of the standard carries on its end a yoke 12 between the flanges 13 of which and the opposite sides of said post are journaled a pair of pulley sheaves 14 said sheaves being mounted upon the journal bolt 15 passing through said post and said flanges. A guy fixture 16 is mounted on the top of the yoke 12 by a pivot bolt 17 passing down into the upper end of the standard leaving said fixture so that it can be held rigidly while the standard swivels. This fixture as illustrated has three ears 18 turned up at the sides of the standard and to which guy ropes 19 are attached for supporting the upper end of the standard when in erect position. The carriage C is in the form of a skeleton frame freely embracing the standard so as to slide up and down thereon. To the lower end and on the forward side of this carriage is secured a journal block 20 in which is mounted a transverse shaft 21. The lower end of the carriage is provided with two oppositely disposed antifriction wheels 22 and on its sides with a pair of antifriction wheels 22' which respectively bear upon the sides and front of the standard and serve to assist in causing the carriage to slide more freely up and down on the standard. The wheels 22' are journaled on the shaft 21 with the journal block 20 between them. The upper end of the carriage on the opposite sides is also provided with antifriction wheels 23 which also serve for the same purpose as the ones at the lower end. The upper end at the back of the carriage is formed with a yoke 24 in which is journaled antifriction wheels 25 bearing against the back of the standard and a backwardly depending sleeve 26 for the purposes to be hereinafter described.

Rigidly mounted upon the shaft 21 in horizontal position is the platform B which is composed of a plurality of parallel tines 27 the forward ends of which are open and project a considerable distance from the carriage. The back ends of the tines project a short distance from the shaft 21 past the standard and are rigidly secured and supported by means of a transverse bar 28. A triangular reinforcing frame 29 is rigidly secured to the bar 28 with its apex projecting back away from the standard and its lower ends journaled to the shaft 21. To the apex of this frame is pivoted at 30 the lower end of a ratchet bar 31. The upper end of this rod inclines and slides freely in the sleeve 26 to permit the platform B to swing up and down on the shaft 21. To limit the declining movement of the forward end of said platform a coil compression spring 32 is mounted upon the rod 31 in the path of the lower end of the sleeve 26 so that when the outer end of the platform declines, said spring is compressed on the rod 31 and said movement limited and the shock absorbed. The carriage, platform and other parts of the mechanism which are carried thereby are lifted upon the standard by the hoisting apparatus E which consists of a system of blocks and tackle, the rope 34 of which is doubled back and forth over the pulleys 14 through a block 33 and sheave 35 which is connected by a swivel joint 36 to the flange 9 of the cup member 8 of the journal bearing 7 at the lower end of said standard. Attached to the free end of this rope is a draw bar 37 to which a horse may be attached for lifting the load which is carried by said hoisting apparatus. A bale frame 54 is provided with a number of vertical frame rods 38 and the lower ends of these rods together with the lower ends of the sides of said bale frame are freely journaled upon the shaft 21. The upper end of this bale frame is attached by a hook and eye connection 39 to the block 33 of the hoisting apparatus so that when the rope 34 is drawn away from the device the block and tackle lifts the platform and carriage into superior position as illustrated in Fig. 4, part of the rope 34 being broken away to illustrate the apparatus more clearly. When the load is placed on the platform and the latter lifted by the hoisting apparatus into superior position, said load can be ejected from the platform by allowing said platform to tilt into declining position as illustrated in Fig. 4. To accomplish this result a lock bolt 40 is slidingly mounted upon the sleeve 26 in the casing 41 which is securely clamped over the sleeve by means of the bolts 42 and 46. The side of the sleeve is formed with an opening 43 through which the lock bolt enters the sleeve and intercepts the rod 31 and serves to hold the platform in horizontal position. The lock bolt is automatically pressed into intercepting position as illustrated in Fig. 5 by means of the compression spring 44. For the purpose of withdrawing the lock bolt out of locking position against the tension of the spring 44 is provided a bell crank lever 45 the angle of which is journaled upon the bolt 46 passing through the casing 41. The short arm 47 of said lever plays in a slot 48 in the lock bolt 40 and is adapted to engage said lock bolt to move it into receded position. The power end 49 of said lever projects from the casing and has connected thereto an operating cord 50 by which the lever may be pulled down and the lock bolt automatically returned into locking position illustrated in Fig. 6 whereupon the rod 31 slides up in the sleeve 26 and allows the outer end of the platform to tilt down and eject the load which the platform carries.

Secured to the back of the bale frame 37 is a pair of brace arms 51 the upper ends of said rods being connected to the carriage by the bifurcated coupling 52 the ends of which are journaled upon the bolts 53 which carry the antifriction wheels 23. The brace arms 51 are sectional and the ends of said sections are adjustably secured together by clamps 59 which permit said braces to be adjusted longitudinally for any wear or straining of the parts of the platform. These braces communicate the load if unevenly placed upon the platform to the antifriction wheels 23 which in turn serve to relieve or partly relieve undue friction of the carriage against the standard. The antifriction wheels 22 and 25 also serve the same purpose and thus provide a freely running carriage upon the standard no matter how heavy a load is unevenly distributed upon the platform.

In operation the hay is lifted upon the platform and the hoisting apparatus made to lift the load by pulling upon the rope 34. After the load is lifted and the platform swung into the desired position by the standard, the lever 45 is tripped by pulling upon the cord 50 and the platform tilted with its outer end down into the position illustrated in Fig. 4 by the broken lines and the load of hay or other material slides off of said platform upon the ground or partly completed stack. The platform is then swung back and lowered by the hoisting apparatus until it rests upon the ground whereupon it assumes horizontal position, and the dog 40 intercepts the path of the ratchet bar.

In accordance with the patent statutes I have described the principles of operation of my invention together with the apparatus which I now consider to represent the best embodiment thereof but I desire to have it understood that the construction shown is only illustrative and that the invention can be carried out by other means and applied to uses other than those above set forth within the scope of the following claims.

Having described my invention, what I claim as new and desire to protect by Letters Patent is:—

1. An agricultural implement, comprising, in combination, a standard, an elevating platform, a carriage mounted to move lengthwise on said standard, said platform being journaled between its outer and inner ends upon said carriage to tilt its outer end down, a rod extending upward from the rear end of said platform, a second rod extending downward from said carriage having sliding connection with said other rod, a lock between said rods adapted to hold said platform in substantially horizontal position, and means for disengaging said lock from between said rods permitting said platform to pitch with its outer end down.

2. An agricultural implement, comprising, in combination, a standard, an elevating platform journaled between its outer and inner ends upon said carriage to tilt its outer end down, a rod extending downward from said carriage, a second rod extending upward from the rear end of said platform and in sliding engagement with said other rod, a lock between said rods holding said platform in substantially horizontal position, means for disengaging said lock from between said rods and permitting said platform to pitch with its outer end down, and means for limiting the downward pitching movement of said platform.

3. An agricultural implement, comprising, in combination, a standard, an elevating platform journaled between its outer and inner ends upon said carriage to tilt its outer end down, a rod extending downward from said carriage, a second rod extending upward from the rear end of said platform and in sliding engagement with said other rod, a lock between said rods holding said platform in substantially horizontal position, means for disengaging said lock from between said rods permitting said platform to pitch with its outer end down, and means for cushioning the platform when it tilts into pitching position.

4. An agricultural implement, comprising, in combination, a standard, an elevating platform, a carriage mounted to move lengthwise on said standard, said platform being journaled between its outer and inner ends upon said carriage to tilt its outer end down, a rod extending upward from the rear end of said platform, a rod extending downward from said carriage and in telescopic connection with said other rod, a lock between said rods holding said platform in substantially horizontal position, a spring tending to hold said lock in locking position, means for disengaging said lock from between said rods to allow said platform to pitch with its outer end down, and means for raising said carriage on said standard and the parts which it supports.

5. An agricultural implement, comprising, in combination, a standard stepped in a journal at its lower end and pivotally supported at its upper end in substantially erect position, a carriage mounted to move up and down on said standard, a bale frame extending laterally to each side of said standard, said platform being journaled in the lower ends of said carriage and bale frame between its outer and inner ends to tilt with its outer end down, an element extending upward from the rear end of said platform engaging near its upper end with said carriage and holding said platform in substantially horizontal position, and means for releasing said element from engaging position to permit said platform pitching with its outer end downward.

6. An agricultural implement, comprising, in combination, a standard stepped in a journal at its lower end and pivotally supported at its upper end in erect position, a carriage mounted to travel up and down on said standard, a lateral bale frame, an elevating platform journaled between its outer and inner ends across the lower end of said frame and in said carriage to tilt with its outer end down, an element extending upward from the rear end of said platform, a depending socket member carried by said carriage and in which the upper end of said element slides, a movable dog carried by said socket member and engaging said element to hold said platform in substantially horizontal position, means for withdrawing said dog out of engagement with said element to release and allow said platform to tilt with its outer end down, means for limiting the downward movement of the outer end of said platform and means for raising said carriage and the parts which are attached thereto on said standard.

7. An agricultural implement, comprising, in combination, a standard stepped in a journal bearing at its lower end and pivotally supported in erect position at its upper end, a carriage mounted to travel up and down on said standard having a support extending in opposite lateral directions from said standard, a platform journaled across the lower end of said frame to tilt with its outer end pitching down, a tube declining backward from said carriage above said platform, a rod pivotally attached to the rear end of said platform and telescoping in said tube, a lock carried by said tube and adapted to intercept the path of said rod to support said platform in substantially horizontal position, a spring carried by said rod against which said tube impinges to cushion and limit the tilting movement of said platform, means tending to hold said lock in the path of said rod, means for withdrawing said lock from engagement with said rod and means for hoisting said carriage and the parts which are mounted thereon.

In testimony whereof, I have signed my name to this specification, in the presence of two subscribing witnesses.

JOHN H. ANDERSON.

Witnesses:
  H. L. FISCHER,
  JULE DONOVAN.

---

Copies of this patent may be obtained for five cents each, by addressing the "Commissioner of Patents, Washington, D. C."